United States Patent [19]
Fukuda et al.

[11] Patent Number: 5,764,294
[45] Date of Patent: Jun. 9, 1998

[54] IMAGE CODING DEVICE TO BE MANUFACTURED AT LOW COST AND TO BE USABLE WITH LOW-SPEED MEMORY

[75] Inventors: Naoyuki Fukuda, Kita-Katsuragi-gun; Kenji Kawahara, Nara, both of Japan

[73] Assignee: Sharp Kabushiki Kaisha, Osaka, Japan

[21] Appl. No.: 741,706

[22] Filed: Oct. 31, 1996

Related U.S. Application Data

[63] Continuation of Ser. No. 186,615, Jan. 26, 1994, abandoned.

[30] Foreign Application Priority Data

Feb. 5, 1993 [JP] Japan .................................. 5-018669

[51] Int. Cl.$^6$ ...................................................... H04N 7/32
[52] U.S. Cl. .......................... 348/394; 348/416; 348/699
[58] Field of Search .......................... 348/390, 393–396, 348/401, 402, 407–413, 415, 416, 699; 382/232, 236, 238; H04N 7/130, 7/137

[56] References Cited

U.S. PATENT DOCUMENTS

| | | | |
|---|---|---|---|
| 4,858,004 | 8/1989 | Kitagaki et al. | 348/396 |
| 5,253,078 | 10/1993 | Balkanski et al. | 348/409 |
| 5,267,037 | 11/1993 | Sugiyama | 348/384 |
| 5,414,469 | 5/1995 | Gonzales et al. | 348/408 |

OTHER PUBLICATIONS

T. Urabe, et al., "MPEGTool: an X window–based MPEG encoder and statistics tool", Multimedia Systems (Mar. 1994) 1:220–221 ISO/EIC 11172-2:1993, Decoder Overview, p. 56 (1993).

"Processing a Digital Signal of a TV Image" Fukinuki, Daily Industrial Newspaper, Ltd., pp. 201–207, 1988. (No English Translation).

Image Coding Technique–DCT and Its International Standards, K.R. Rao, Ohm, Ltd., pp. 103–112, 1992. (No English Translation).

"A High–Performance Full–Motion Video Compression Chip Set", Ruetz et al., IEEE Transactions on Circuits and Systems for Video Technology, pp. 111–122, Jun. 1992.

"An All–Asic Implementation of a Low Bit–Rate Video Codec", Fujiwara et al., IEEE Transactions on Circuits and Systems for Video Technology, pp. 123–133, Jun. 1992.

"A Dedicated Circuit for Real Time Motion Estimation", Colavin et al., Proceedings of IEEE Euro ASIC Conference, pp. 96–99, 1991.

"International Standards for Multimedia Coding", Yasuda, Maruzen, Ltd., 1991. (No English Translation).

"L64760 Inter–Frame Processor Preliminary", LSI Logic Corporation, Nov. 1990, pp. 1–14.

"A 50 MHz Vision Processor", Sutardja et al., IEEE, 1991, Custom Integrated Circuits Conf., pp. 12.3.1–12.3.3.

*Primary Examiner*—Richard Lee

[57] ABSTRACT

A video coding device has an image motion detector, an inter-frame differencer, a discrete cosine transforming unit, and a variable length coder mounted on a single LSI. The video coding device further includes a first memory for storing a video signal block composed of a luminance signal and two color difference signals of the current frame, a second memory for storing a searching area for the luminance signal block of the previous frame, and a third memory for storing blocks of the luminance signal and two color difference signals corresponding to the detected motion vector. The video coding device operates to concurrently execute a process for detecting motion of an image from the luminance signals stored in the first and the second memories using the motion detector, a process for coding a video signal from the luminance signal and two color difference signals stored in the first and the third memories using an inter-frame predictor and a coder, and a process for outputting the coded signal at each of the serial macro blocks composing the input video signal.

18 Claims, 6 Drawing Sheets

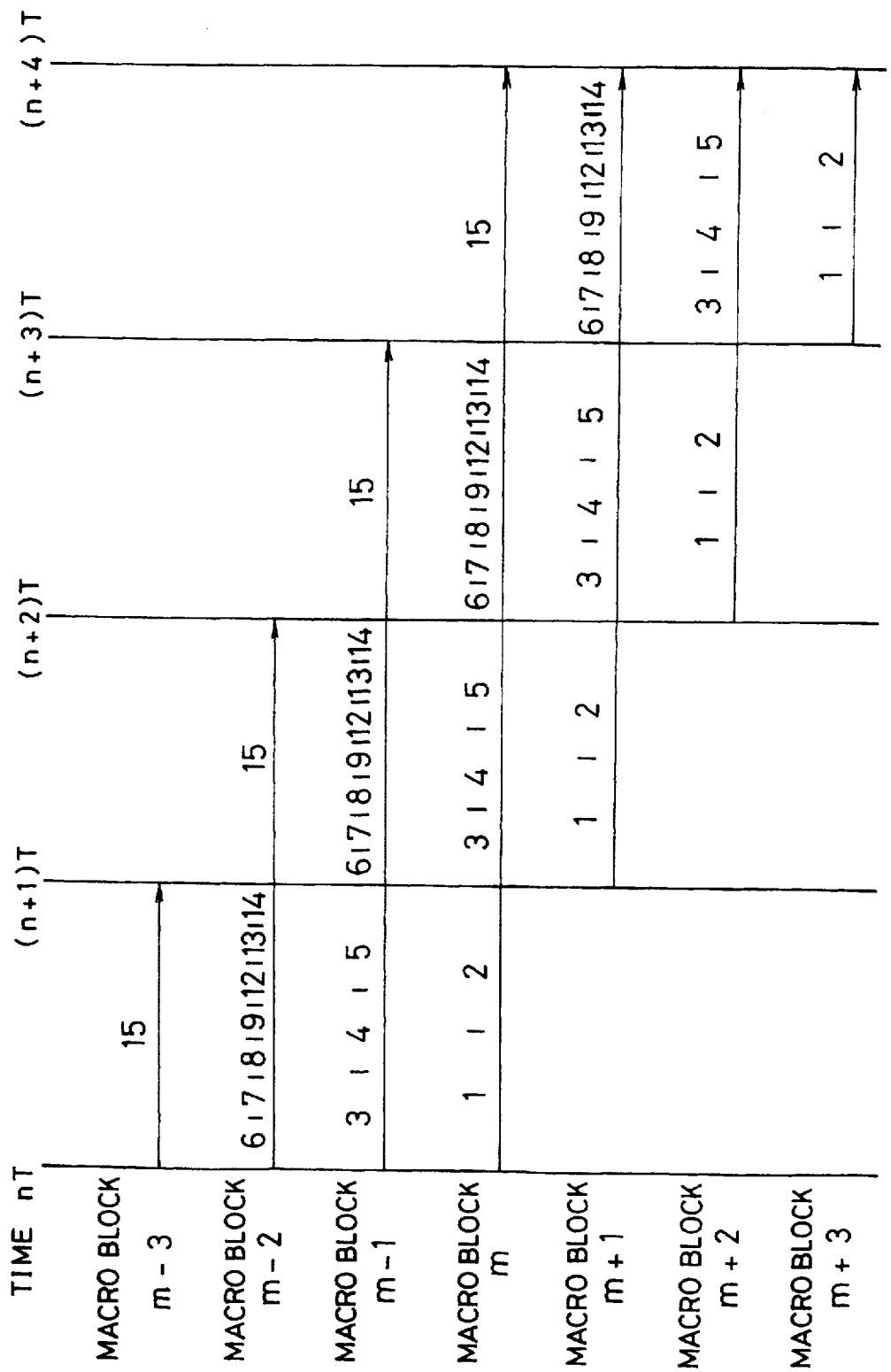

IMAGE CODING DEVICE TO BE MANUFACTURED AT LOW COST AND TO BE USABLE WITH LOW-SPEED MEMORY

This application is a continuation of application Ser. No. 08/186,615 filed on Jan. 26, 1994, now abandoned.

BACKGROUND OF THE INVENTION

1. Field of the Invention

The present invention relates to an image coding device which is arranged to code a video signal composed of a luminance signal and two color difference signals.

2. Description of the Related Art

As a method for coding an image, there have been known JPEG, H. 261 and MPEG as international standards. The algorithms provided in the JPEG, H. 261, and MPEG are described in "Hiroshi Yasuda: International Standards for Multimedia Coding, Maruzen, Ltd., 1991, pages 14 to 155", for example. These coding systems are arranged to code an image represented by a luminance signal and two color difference signals at each 64-pixel unit. Concretely, each coded image section has an arrangement consisting of eight×eight pixels, each one pixel of which consists of eight bits, the arrangement being referred to as a block. Hereafter, the luminance signal and two color difference signals are represented by a Y signal and two C signals, respectively. The H. 261 and the MPEG, that is, the system for coding a dynamic image use motion compensation, inter-frame prediction, orthogonal transformation, and variable length coding. The motion compensation or the inter-frame prediction is arranged to reduce the amount of information by replacing four blocks, each block consisting of 16×16 pixels, of a Y signal of the current frame with the most matched blocks of the previous frame. In general, it is implemented by the motion detection, the determination as to whether or not the motion compensation is to be done, the inter-frame difference, and the creation of an image of the previous frame. The motion detection is arranged to do matching a block of the Y signal of the current frame to the corresponding block of the previous frame with a sum of a difference between an absolute value for each pixel in the block of the current frame and that in the previous frame and output a motion vector having the most excellent matching characteristic to the searching area. This operation is discussed in detail in the Japanese Patent Lying Open No. Hei 3-340944 or "Fukinuki: Processing a digital signal of a TV image, published by Daily Industrial Newspaper, Ltd., 1988, pages 201 to 207". The algorithm for determining whether or not the motion compensation is to be done is described in "L64760 of the LSI Logic, Ltd., Inter-frame Processor Data Book, page 6".

For the orthogonally transforming (or simply coding), a discrete cosine transformation (referred to as DCT) is used. The DCT operating system is described in "K. R. Rao, translated by Hiroshi Yasuda: Image Coding Technique— DCT and its International Standards, published by Ohm, Ltd., 1992". For the variable length coding, a Huffman coding method is used.

An input signal is defined according to the coding system. For example, the H. 261 uses a CIF signal (360×288 pixels, 8 bits per pixel, and 30 frames per second) as its input signal and executes the foregoing algorithm at each four blocks of the Y signal and two blocks of the C signal, each block being referred to as a macro block.

As an picture coding device, there has been known a coding device which has two LSIs, one of which serves to detect a motion vector for motion compensation (referred to as a motion detecting LSI) and the other of which serves to perform the DCT operation (referred to as a DCT LSI).

FIG. 1 shows a typical arrangement of the device for coding a moving picture having the motion detecting LSI and the DCT LSI, the arrangement for implementing the H. 261. The moving picture coding device shown in FIG. 1 is arranged to have a current frame memory 301, a subtractor 302 connected to the memory 301, a DCT LSI 303 connected to the subtractor 302, a quantizer 304 connected to the DCT LSI 303, the motion vector detecting LSI 305 connected to the memory 301, an inverse quantizer 306 connected to the quantizer 304, a reverse DCT LSI 307 connected to the inverse quantizer 306, a previous frame memory 308 connected to the inverse DCT LSI 307, a variable length coder 309 connected to the quantizer 304, and a control unit 310 connected to the subtractor 302, the quantizer 304, the inverse quantizer 306, the previous frame memory 308, and the motion detecting LSI 305. In operation, the subtractor 302 serves to derive a difference at a block unit. The DCT LSI 303 serves to perform a reverse DCT operation by changing a coefficient value. The quantizer 304 serves to quantize the DCT coefficient. The inverse quantizer 306 serves to transform the quantizing value into the DCT coefficient. The reverse DCT LSI 307 serves to perform an inverse DCT operation for deriving the value for each pixel value from the DCT coefficient of the block. The previous frame memory 308 serves to store a block output from the inverse DCT LSI 307. The variable length coder 309 serves to code the quantized value into a Huffman code. The control unit 310 serves to determine whether or not the motion compensation is to be done, and control the difference on or off and a quantizing parameter based on the determined result.

The operation of the coding device shown in FIG. 1 will be described below.

At first, a Y signal is input from the current frame memory 301 to the motion detecting LSI 305 as a block signal for detecting the motion vector, while an area for searching a motion vector is input from the previous frame memory 308 to the motion detecting LSI 305. Next, the block composed of a Y signal and two C signals corresponding to the motion vector output from the motion detecting LSI 305 is sent from the previous frame memory 308 to the subtractor 302 and the block of a Y signal and two C signals are sent from the current frame memory 301 to the subtractor 302. The subtractor 302 serves to derive a difference between the block of the previous frame and the corresponding blocks of the current frame and sends the difference to the DCT LSI 303. The DCT LSI 303 derives a DCT coefficient based on the difference and sends it to the quantizer 304. The quantizer 304 quantizes it. Lastly, the quantized value is sent to the inverse quantizer 306 in which it is inverse-quantized. The inverse quantized DCT coefficient is transformed into a pixel value in the DCT LSI 307. The pixel value is written in the previous frame memory 308 at each block. At a time, the quantized value is coded in the variable length coder 309, from which the coded result is output.

Next, some concrete arrangements of a moving picture coding device in which the motion detection and the coding for transformation are separated will be referred as follows.

The LSI Logic, Ltd. has published a video coding chip set according to the CCITT H. 261 standard in IEEE Transactions on Circuits and Systems for Video Technology (June, 1992, pages 111 to 122). This realizes the motion detection and the orthogonal transformation or simply coding with different LSIs.

The Graphic Communications Technology, Ltd has published a video coding chip according to the CCITT H.261 standard in IEEE Transactions on Circuits and Systems for Video Technology (June 1992, pages 123 to 133).

The SGS Thomson, Ltd. has published the motion detecting LSI STI3220 and the discrete cosine transforming LSI STV3208 in IEEE Euro ASIC Conference (1991, pages 96 to 99).

In the coding device arranged as shown in FIG. 1, the previous frame memory 308 requires the following three I/Os.

(1) Output of a Y signal in the range for searching a motion vector (2) Outputs of a Y signal and two C signals collated after the motion vector is determined (3) Inputs of a Y signal and two C signals after the inverse DCT is performed Herein, for the block of a Y signal consisting of 16×16 pixels and the two blocks of two C signals consisting of 8×8 pixels when coding the CIF signal, the amount of data required for the I/Os (1) to (3) will be indicated blow. The amount of data for the output (1) is 48×48=2304 bytes assuming that the range for searching the motion vector consists of −16 pixels to +15 pixels in horizontal and vertical, those pixels to be coded according to the H. 261. The conceptual map of the searching range is shown in FIG. 2. FIG. 2 indicates two domains consisting of 48×48 pixels. One domain is composed of the searching areas 601, 602, 603, 604, 606, 607, 608 and 609 prepared for the block 605 consisting of 16×16 pixels and the other domain is composed of the searching areas 604, 605, 606, 607, 608, 609, 610, 611 and 612 prepared for the block 608 consisting of 16×16 pixels. In the searching areas, the adjacent blocks 604, 605, 606, 607, 608 and 609 are the shared searching areas. The searching areas 610, 611 and 612 except the shared searching area correspond to the pixel data required for the update. The data to be updated contains 48×16=768 bytes. The amount of data in the outputs (2) is 16×16+8× 8×2=384 bytes. The amount of data in the input (3) is 16×16+8×8×2=384 bytes.

The known pixel coding device in which the motion detection and the DCT operation are not mounted on a single chip provides a larger number of chips than the device having both of the functions mounted on one chip and needs so large a data amount to be input to or output from the previous frame memory that it may need a high-speed and large-capacitance RAM. Hence, the known coding device is made more costly.

To lower the cost of the video coding device, two ways may be used. In one way, several functions are integrated for reducing the number of LSI components. In the other way, a low-speed external memory may be used.

Regarding the first solution, if the motion detection and the coding for transformation are realized on one LSI, two problems have to be solved. One problem is that the amount of data to be transferred between the previous frame memory and the LSI is made lower. The other problem is that the amount of memory on the LSI required for the motion detection is made as small as possible. The IIT, Ltd. has published an LSI having the motion detecting function and the coding for transformation mounted on a single chip in IEEE Custom Integrated Circuits Conference (1991, number 12. 3. 1). The publication suggests no system for reducing the amount of a transfer memory of a Y signal of the output (2) and transferring data of two C signals of the output (2).

To implement the motion detection and the orthogonal transformation on a single LSI, it is not obvious how the Y signal and two C signals in the searching range for the motion detection are arranged on a smaller memory of the LSI. For example, the method for inputting the Y signal and two C signals in the area for searching the motion vector to the LSI at one time has a shortcoming that the memory area for two C signals is idle because two C signals are not used for the motion detection.

Regarding the second solution, to use a low-speed memory, a method has been proposed where the input processing, the motion detection, the coding, the output processing to the next stage are required to be done concurrently. The LSI published by the IIT, Ltd., however, does not concretely indicate the second solution.

SUMMARY OF THE INVENTION

It is an object of the present invention to provide a less costly video coding device.

In carrying out the object, a video coding device for coding a video signal composed of a luminance signal and two color difference signals, includes: means for detecting motion of an image; means for performing inter-frame prediction; means for coding the video signal; first storage means for storing a video signal of a current frame; second storage means for storing a searching area for the luminance signal of the previous frame, for detecting motion of an image; third storage means for storing areas of the luminance signal and two color difference signals obtained as a result of detecting the picture motion vector; and the motion vector detection being carried out with respect to the luminance signals stored in the first and second storage means by means of the means for detecting the picture motion vector and the video signal of the current frame stored in the first storage means and the areas of the luminance signal and two color difference signals stored in the first and third storage means being coded by the inter-frame predicting means and the coding means.

Further, the video coding device further includes control means for concurrently executing a process of inputting the video signal into the first and the second storage means, a process of detecting the luminance signals stored in the first and second storage means for detecting motion vector of an image, a process for coding the luminance signal and two color difference signals are stored in the first and third storage through the effect of the inter-frame predicting means and the coding means, and a process of outputting the coded result.

In operation, the video coding device according to the present invention operates to do block matching of the Y signals are stored in the first and the second memories through the effect of the motion detecting means. The Y signal serves to transfer the block corresponding to the obtained motion vector from the second memory to the third memory. The C signal is used to transfer the blocks corresponding to the motion vector from the previous frame memory to the third memory. For the inter-frame prediction and the coding operation, the Y and the C signals are stored in the first and the third memories.

The coding device operates to concurrently execute a process for inputting the video signal to the first memory and the second memory, a process for detecting a motion of the Y signal stored in the first and the second memories through the effect of the motion detecting means, a process of coding the Y signal and two C signals are stored in the first and the third memories through the effect of the inter-frame predicting means and the coding means, and a process for outputting the coded result in a macro block by macro block manner. The content of the coding process will be indicated as follows.

(Step 1) Transfer the Y signal and two C signals from the external frame memory to the first memory.

(Step 2) Transfer the Y signal from the external frame memory to the second memory.

(Step 3) Detect a motion with the Y signals stored in the first and the second memories.

(Step 4) Transfer the block of the Y signal for the motion vector from the second memory to the third memory.

(Step 5) Determine the motion compensation.

(Step 6) Derive a difference between the Y signals stored in the first and the third memories and code the difference.

(Step 7) Transfer a block of two C signals corresponding to the motion vector from the external frame memory to the third memory.

(Step 8) Derive a difference between the C signals stored in the first and the third memories and code the difference.

(Step 9) Output the coded results of the Y signal and two C signals.

For a macro block m, at the time [0 to T], the operations at the steps 1 and 2 are executed. At the time [T to 2T], the operations at the steps 3 and 4 are executed. At the time [2T to 3T] , the operations at the steps 5, 6, 7 and 8 are executed. At the time [3T to 4T], the operation at the step 9 is executed.

As described above, the image coding device according to the present invention makes it possible to implement the motion detecting means, the inter-frame predicting means, the DCT operating means, and the variable length coder mounted on a single LSI. It means that the image coding device can be manufactured at low cost.

Further objects and advantages of the present invention will be apparent from the following description of the preferred embodiments of the invention as illustrated in the accompanying drawings.

BRIEF DESCRIPTION OF THE DRAWINGS

FIG. 6 is a chart showing a pipelined operation to be executed when the dynamic image coding system of the H. 261 is implemented in the arrangements shown in FIGS. 3 and 4.

DESCRIPTION OF THE PREFERRED EMBODIMENTS

Hereafter, the description will be oriented to an image coding device according to an embodiment of the present invention.

Figure 3:
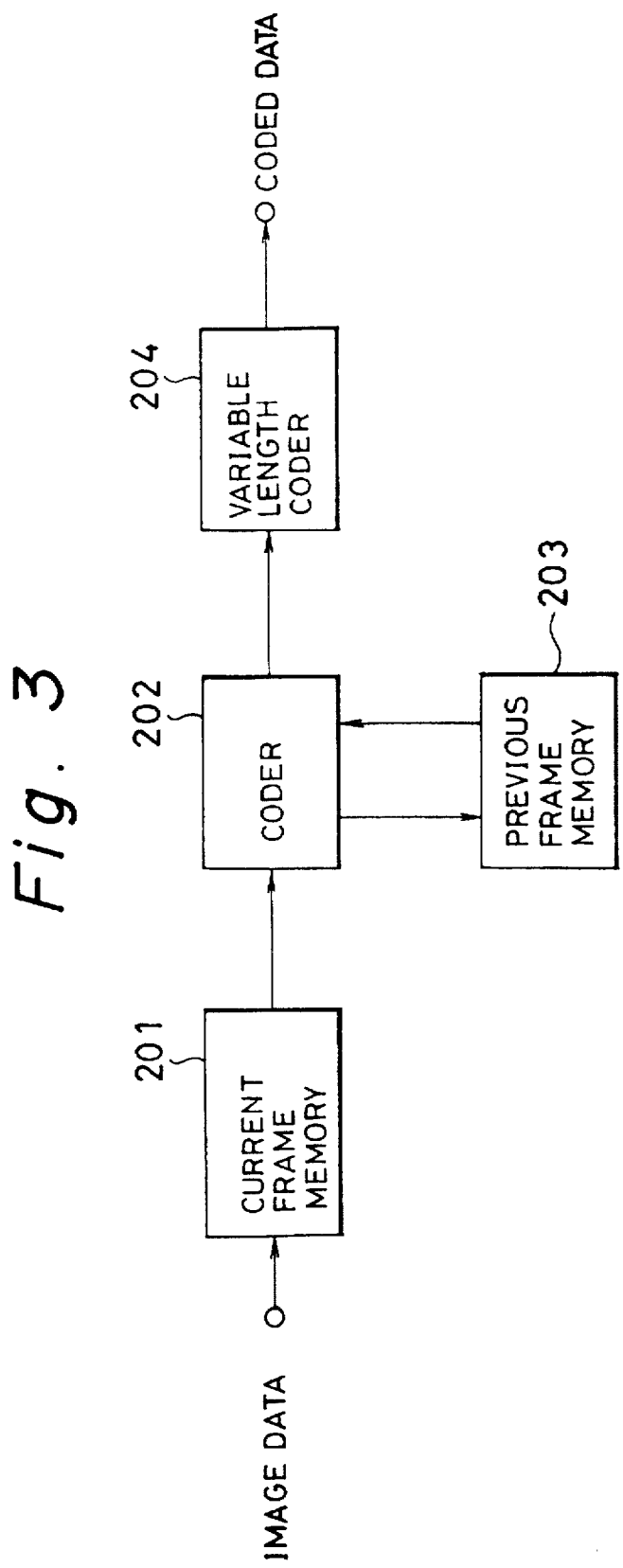
FIG. 3 is a block diagram showing an arrangement of an image coding device according to an embodiment of the present invention.
Figure 4:
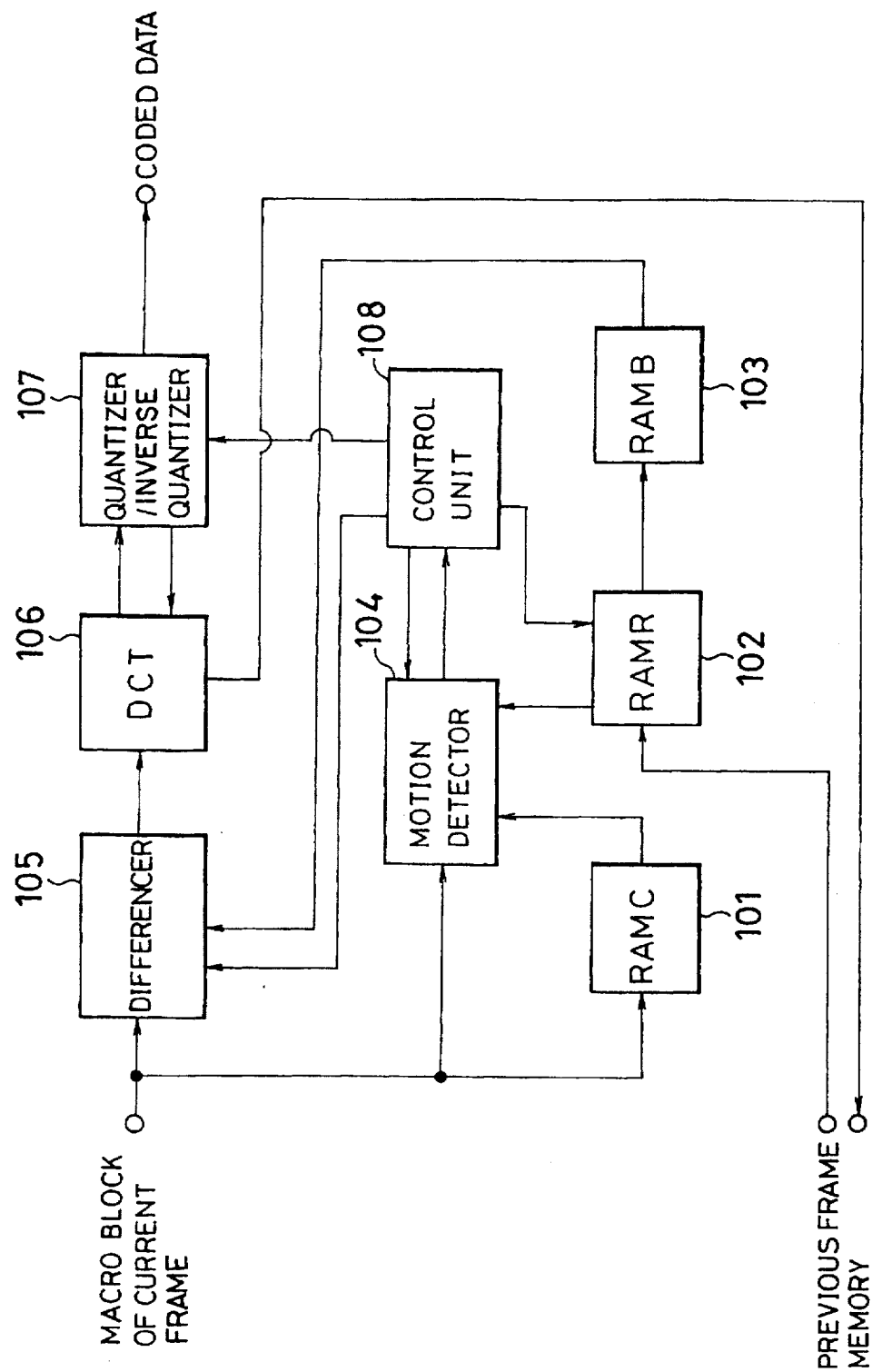
FIG. 4 is a block diagram showing an arrangement of a coder included in the image coding device shown in FIG. 3.

FIG. 3 shows an arrangement of an image coding device according to an embodiment of the invention. As shown, the image coding device is arranged to have a current frame memory 201, a coder 202 connected to the current frame memory 201, a previous frame memory 203 connected to the coder 202, and a variable length coder 204 connected to the coder 202. The image data is input to the current frame memory 201. The coder 202 is, as shown in FIG. 4, configured of a memory RAMC 101 connected to the current frame memory 201, a memory RAMR 102 connected to the previous frame memory 203, a memory RAMB 103 connected to the RAMR 102, a motion detector 104 connected to the current frame memory 201, the RAMC 101 and the RAMR 102, a differencer 105 connected to the current frame memory 201 and the RAMB 103, a DCT operating unit 106 connected to the differencer 105 and the previous frame memory 203, a quantizer/reverse quantizer 107 connected to the DCT operating unit 106, and a control unit 108 connected to the RAMR 102, the motion detector 104, the differencer 105, and the quantizer/reverse quantizer 107. The macro blocks of the current frame are transferred to the differencer 105 and the RAMC 101.

Figure 5:
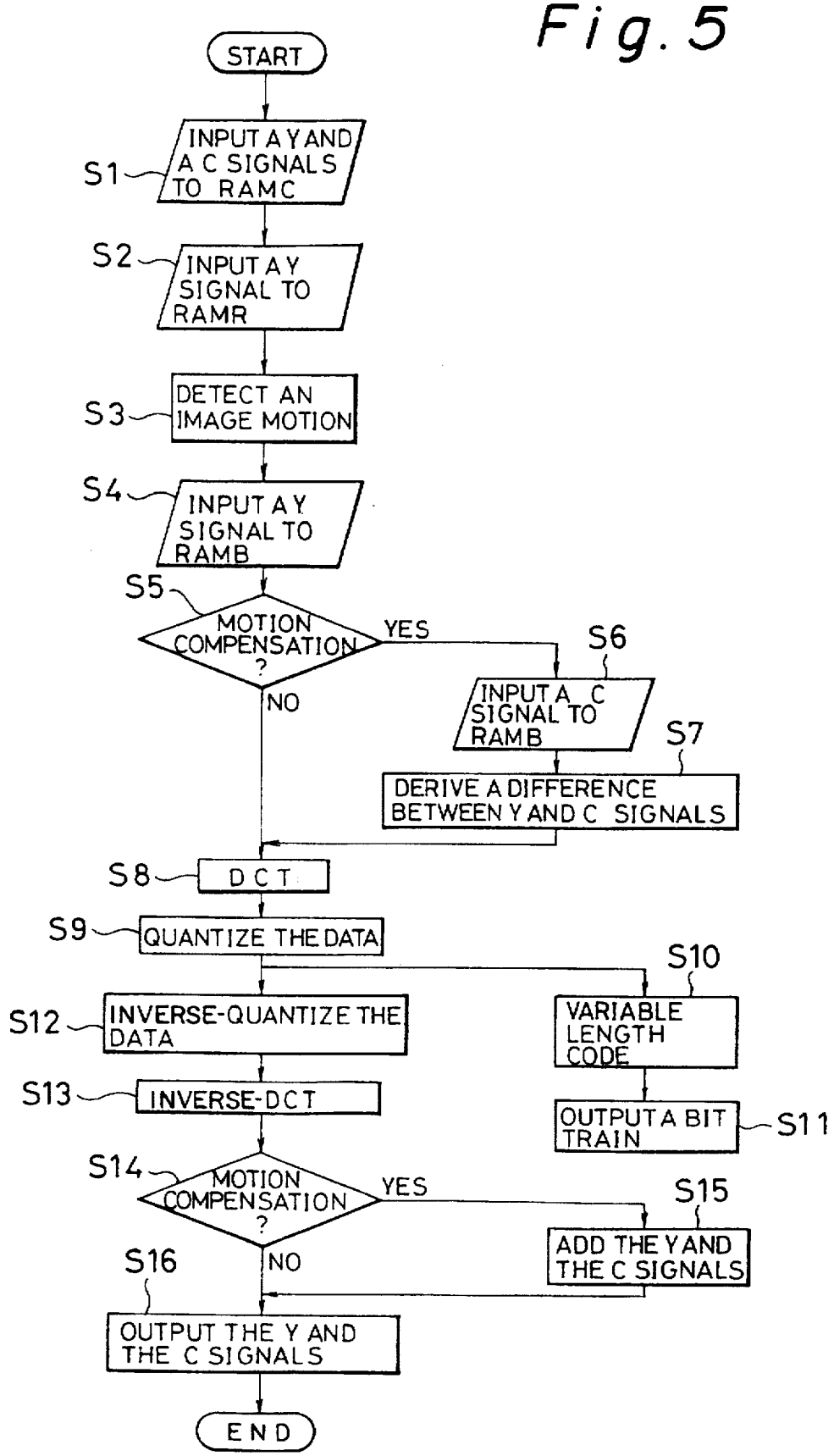
FIG. 5 is a flowchart showing a process for implementing the dynamic image coding system of the H. 261 in the arrangements shown in FIGS. 3 and 4.

At first, the description will be oriented to the process based on the image coding international standard H. 261 for coding the image at a unit of a block consisting of 8×8 pixels with reference to FIGS. 3, 4 and 5.

Six macro blocks are input from the current frame memory 201 to the RAMC 101 (step S1). The six macro blocks consists of four blocks of a Y signal and two blocks of two C signals. At a time, all the pixels in the motion-searching range covered by the blocks of the Y signal are input from the previous frame memory 203 to the RAMR 102 (step S2). Assuming that the motion-searching range covered by the blocks of the Y signal stays from −16 to +15 pixels in the vertical and the horizontal manners, the Y signal covering 48×48 pixels containing the Y-signal blocks is stored in the RAMR 102.

Next, the block of the current frame stored in the RAMC 101 is matched to the corresponding block of the previous frame stored in the RAMR 102 for detecting a motion vector of the Y signal (step S3). The blocks of the Y signal matched to the detected motion vector are transferred from the RAMR 102 to the RAMB 103 (step S4). Next, it is determined whether or not the motion compensation is to be done based on the Y signals stored in the RAMC 101 and the RAMB 103 (step S5). If it is determined that the motion compensation is done, the blocks of the C signal corresponding to the motion vector and input from the previous frame memory 203 to the RAMB 103 (step S6). Then, the difference is derived between the Y signal and the C signal of the current frame stored in the RAMC 101 and the Y signal and the C signal of the previous frame stored in the RAMB 103 (step S7). Then, the difference is input to the DCT operating unit 106. If it is determined that no motion compensation is done, the blocks of the Y signal and the C signal in the RAMC 101 are applied to the DCT operating unit 106.

Next, the DCT operating unit performs the DCT operation with respect to the input data (step S8). The resulting value is sent to the quantizer/reverse quantizer 107 for quantizing the value (step S9). The quantized value is transformed into a variable length code in the variable length coder 204 (step S10). The variable length coder 204 outputs a bit train (step S11).

The quantized output is inverse-quantized (step S12). The inverse DCT is performed with respect to the inverse-quantized value (step S13). Lastly, in the case of the inter-block, the inverse DCTed Y and C signals are differences, which are added to the value of the RAMB 103 (step S15). The added result is output to the previous frame memory 203 so that the content of the frame memory may be updated (step S16). In the case of the intra-block, the inverse DCTed output value is output to the previous frame memory 203 so that the content of the previous frame memory 203 may be updated (step S16).

According to the procedure as described above, the operations at the steps S1, S2, S6, S11 and S15 perform an I/O with the external unit. Since a low-speed RAM is used for the frame memory, the coder is concurrently operated at each macro block.

FIG. 5 shows an example of the concurrent operations of the coder 202. For example, the operations at the steps S1 and S2 are executed at the first stage. The operations at the steps S3, S4 and S5 are executed at the second stage. The operations at the steps S6 to S9 and S12 to S14 are executed at the third stage. The operation at the step S15 is executed at the fourth stage. These executions indicate that inputting of a macro block from the external frame memory to the LSI, the motion detection and the coding, outputting of the data from the LSI to the outside frame memory, and outputting of the data to the variable length coder are concurrently carried out. The operations at the steps S10 and S11 are executed in the variable length coder 204.

The procedure for the continuous macro blocks m−3, m−2, m−1, m, m+1, m+2, and m+3 will be described with reference to FIG. 6.

At the time (n+1)T, for the macro block m−3, the execution of the operation of the step S15 is completed. For the macro block m−2, the execution of the operations of the steps S6, S7, S8, S9, S12, S13 and S14 is completed. For the macro block m−1, the execution of the operations of the steps S3, S4 and S5 is completed. For the macro block m, the execution of the operations of the steps S1 and S2 is completed.

At the time (n+2)T, for the macro block m−2, the execution of the operation of the step S15 is completed. For the macro block m−1, the execution of the operations of the steps S6 to S9 and S12 to S14 is completed. For the macro block m, the execution of the operations of the steps S3 to S5 is completed. For the macro block m+1, the execution of the operations of the steps S1 and S2 is completed.

At the time (n+3)T, for the macro block m−1, the execution of the operation of the step S15 is completed. For the macro block m, the execution of the operations of the steps S6 to S9 and S12 to S14 is completed. For the macro block m+1, the execution of the operations of the steps S3 to S5 is completed. For the macro block m+2, the execution of the operations of the steps S1 and S2 is completed.

At the time (n+4)T, for the macro block m, the execution of the operation of the step S15 is completed. For the macro block m+1, the execution of the operations of the steps S6 to S9 and S12 to S14 is completed. For the macro block m+2, the execution of the operations of the steps S3 to S5 is completed. For the macro block m+3, the execution of the operations of the steps S1 and S2 is completed.

Figure 1:
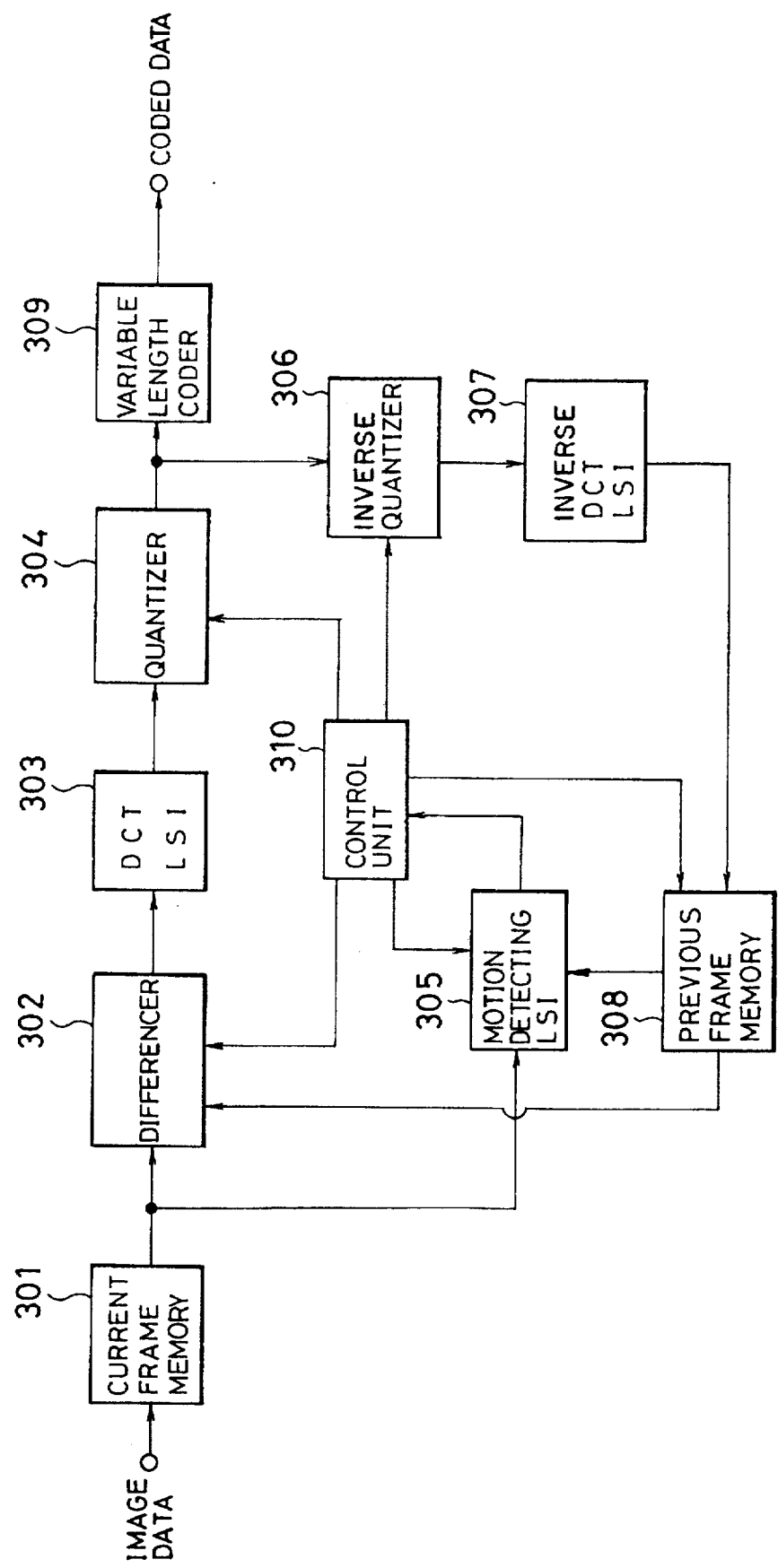
FIG. 1 is a block diagram showing an arrangement of an image coding device according to a related art of the invention.
Figure 2:
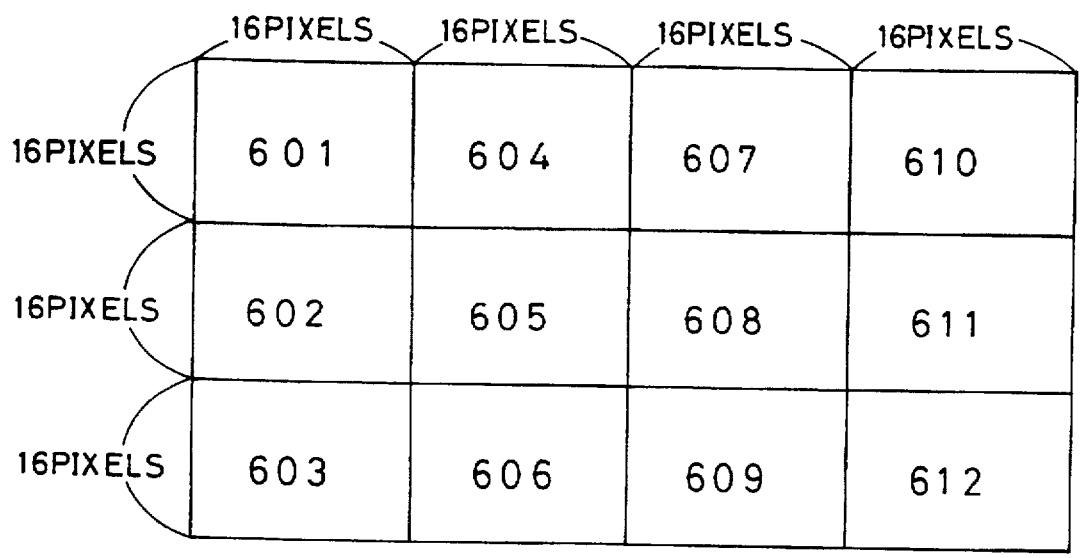
FIG. 2 is a view showing a map indicating an arrangement of a second memory shown in FIG. 4.

The known image coding device as shown in FIG. 1 needs to secure a storage of 256 bytes in the RAMB 103 by accessing the external frame memory. The image coding device according to the invention, on the other hand, does not need access to the external previous frame memory 203, because the Y-signal block is transferred to another on-chip memory at the step S4.

Assuming that the searching range of the motion vector has an arrangement consisting of −16 to +15 pixels in the horizontal and the vertical manners, in the known coding system, the amount of I/O data per one macro block needed by the previous frame memory is 768 bytes in the case of item (1), 384 bytes in the case of item (2), and 384 bytes in the case of item (3), totally, 768+384+384=1536 bytes.

In the present system, the motion detection and the coding function are mounted on a single chip. The amount of I/O data is 768+128+384=1280 bytes.

Since the coding device according to the present invention can be implemented on one LSI, the amount of data to be accessed with the previous frame memory can be reduced by 16%. This makes it possible to use the low-speed RAM in the coding device.

Next, to implement the coding device on a single chip, when the C signal, which is not used for the motion detection, is input from the outside to the RAMB, the effect given by the input of the C signal will be described below.

For the RAMR, since the searching range consists of −16 to +15 pixels in the horizontal and the vertical manners, the amount of memory on the LSI required for the Y signal is 12 times as large as the RAMR provided in the case that the searching range consists of 16×16 pixels in the horizontal and the vertical manners. That is, the required memory is;

(16+16+16+16)×(16+16+16)=3072 bytes

For the RAMR, the amount of data on the LSI required for two C signals is two kinds of data amount which is 12 times as large as the amount of data required in the case of an arrangement consisting of 8×8 pixels. That is, the required data mount is;

(8+8+8+8)×(8+8+8)×2=1536 bytes

For the RAMC, the required memory amount is;

16×16+8×8×2=384 bytes

For the RAMB, the required memory amount is;

16×16+8×8×2=384 bytes

The known system needs as large an amount of the memory on the chip as 5376 bytes in total. The present system, on the other hand, needs as small an amount of the memory on the chip as 3840 bytes, because the RAMR does not need to store two C signals. In comparison, the memory amount of the present system is reduced by 29% as compared with the known system.

The coding device according to the present invention is characterized in that the motion detection and the coding operation are realized on a single LSI, the amount of data to be transferred with the previous frame memory is made smaller, and the cost of the RAM used for the previous frame memory is reduced. Further, the C-signal data is not required to be mounted on the LSI because it is not used for detecting the motion. Hence, the memory on the chip can be reduced.

As described above, according to the present invention, the number of LSIs included in the image coding device is made smaller. Further, since the device may use a low-speed RAM, it may be produced at low cost.

Many widely different embodiments of the present invention may be constructed without departing from the spirit and scope of the present invention. It should be understood that the present invention is not limited to the specific embodiments described in the specification, except as defined in the appended claims.

What is claimed is:

1. A video coding device for coding a video signal composed of a luminance signal and two color difference signals, comprising:

first storage means for storing a video signal of a current frame;

second storage means for storing only a luminance signal of a video signal of a searching area in a previous frame for use in detecting motion of an image;

a motion detector, receiving a luminance signal of the video signal of the current frame from said first storage means and the luminance signal of the searching area in said previous frame from said second storage means, said motion detector determining whether motion compensation is needed based only on received luminance signals;

third storage means for storing, when said motion detector determines motion compensation is needed, a motion compensated video signal of the previous frame;

a differencer, receiving, when said motion detector determines motion compensation is needed, the video signal of the current frame stored in said first storage means and the motion compensated video signal of the previous frame stored in said third storage means, and outputting a difference between the video signals of the current frame and the previous frame; and a coding device, receiving said difference from said differencer, said coding device coding a received signal which is output as coded data.

2. A video coding device as claimed in claim 1, further comprising external frame memories for temporarily storing video signals of the current frame and the previous frame, said external frame memories being connected to said first and second storage means.

3. A video coding device as claimed in claim 1, wherein said coding device provides a function of a discrete cosine transformation.

4. A video coding device as claimed in claim 1, wherein said video signal is processed at a block unit.

5. A video coding device as claimed in claim 1, further comprising a variable length coder for coding a coded signal output from said coding device.

6. The video coding device according to claim 1, further comprising:

inter-frame predicting means for performing inter-frame prediction on said difference; and control means for concurrently executing a process for inputting a video signal of the current frame into said first storage means and the luminance signal of the previous frame into said second storage means, a process of detecting the luminance signal of the video signal of the current frame and the luminance signal of the previous frame stored in said first and second storage means, respectively, for detecting motion of an image, a process for coding the luminance signal and the two color difference signals of the video signal of the current frame and the luminance signal and the two color difference signals of the previous frame stored in said first and third storage means, respectively, via said inter-frame predicting means and said coding device, and a process of outputting a coded result from said process for coding.

7. A video coding device as claimed in claim 6, wherein said motion detector, said inter-frame predicting means and said coding device are mounted on a single chip.

8. A video coding device for coding a video signal composed of a luminance signal and two color difference signals, comprising:

a current frame memory for storing a video signal of a current frame;

a previous frame memory for storing a motion compensated video signal of the previous frame;

a coder connected to said first and second frame memories, for coding an input video signal by comparing the video signal of the current frame with the video signal of the previous frame and for outputting a coded signal; and a variable length coder for transforming said coded signal into a variable length coded signal, wherein said coder includes:

a first memory connected to said current frame memory, which stores a luminance signal of the current frame;

a second memory connected to said previous frame memory, storing only a luminance signal of the previous frame;

a motion detector receiving the luminance signal of the current frame from said first memory and the luminance signal of the previous frame from said second memory, and outputting a detected motion vector based only on received luminance signals;

a third memory storing a luminance signal matched to said detected motion vector and storing two color difference signals matched to said detected motion vector, thereby storing a video signal of the previous frame when said detected motion vector output by said motion detector indicates motion compensation is needed;

a differencer connected to said current frame memory and said third memory, for deriving a difference between said video signal of the current frame and said video signal of the previous frame;

a discrete cosine transforming unit connected to said differencer, performing a discrete cosine transform with respect to said difference and outputting a discrete cosine transformed signal; and a quantizer for quantizing said discrete cosine transformed signal and outputting a quantized signal to said variable length coder.

9. A video coding device as claimed in claim 8, wherein said first memory further stores two color difference signals of the current frame, said third memory further stores two color difference signals, matched to said detected motion vector, and said differencer further derives a difference between said two color difference signals stored in said first memory and said two color difference signals stored in said third memory.

10. The video coding device of claim 8, further comprising: inter-frame predicting means for performing inter-frame prediction on said difference a control unit for controlling operating timings of said coder so as to concurrently execute a process of detecting the luminance signal of the video signal of the current frame and the luminance signal of the previous frame stored in said first and second memories, respectively, for detecting motion of an image, a process for coding the luminance signal and the two color difference signals of the video signal of the current frame and the luminance signal and the two color difference signal of the previous frame stored in said first and third memories, respectively, via said inter-frame predicting means and said coder means, and a process of outputting a coded result from said process for coding.

11. A method of coding a video signal composed of a luminance signal and two color difference signals, comprising the steps of:

storing a video signal of a current frame in a first memory;

storing only a luminance signal of a previous frame in a searching area in a second memory;

determining from said first memory and said second memory, whether an image has moved from only the luminance signal of the previous frame and the luminance signal of the video signal of the current frame and outputting a motion compensation signal;

storing, when said motion compensation signal output by said determining indicates motion compensation is needed, the luminance signal of the previous frame and two color difference signals of the previous frame in a third memory; and coding the video signal of the current frame by using the luminance signal and the two color difference signals of the previous frame.

12. A method as claimed in claim 11, further comprising:

temporarily storing video signals of the current frame and the previous frame in external memories; and connecting said external memories to said first and second memories.

13. A method as recited in claim 11, further comprising variable length coding a coded signal output from said coding step.

14. The method according to claim 11, further comprising: concurrently executing inputting the video signal of the current frame into said first memory and the luminance signal of the previous frame in a searching area into said second memory;

detecting the luminance signal of the video signal of the previous frame for said determining;

said coding; and outputting a coded result obtained from said coding.

15. A method as claimed in claim 11, wherein said coding step comprises deriving, if said determining step indicates image motion, a difference between the luminance signal and the two color difference signals of the video signal of the current frame in said first memory and the luminance signal and the two color difference signals of the previous frame in said third memory.

16. A method as claimed in claim 15, wherein said coding step further comprises discrete cosine transforming the video signal of the current frame when said determining step indicates no image motion, and discrete cosine transforming said difference when said determining step indicates image motion, and outputting a discrete cosine transformed signal.

17. A method as claimed in claim 16, wherein said coding step further comprises quantizing said discrete cosine transformed signal and outputting a quantized signal.

18. A method as claimed in claim 17, further comprising:

updating a previous frame memory, said updating step including the steps of;

inversely quantizing said quantized signal and outputting an inversely quantized signal, inversely discrete cosine transforming said inversely quantized signal and outputting an inversely discrete cosine transformed signal, and outputting to said previous frame memory, when said determining step indicates image motion, a sum of said inversely discrete cosine transformed signal and the luminance signal and the two color difference signals stored in said third memory, and, when said determining step indicates no image motion, said inversely discrete cosine transformed signal.

* * * * *